United States Patent
Yamada et al.

(10) Patent No.: US 8,490,556 B2
(45) Date of Patent: Jul. 23, 2013

(54) METHOD AND FACILITY FOR FEEDING CARBON DIOXIDE TO OXYFUEL COMBUSTION BOILER

(75) Inventors: Toshihiko Yamada, Tokyo (JP); Terutoshi Uchida, Tokyo (JP); Shinji Watanabe, Tokyo (JP); Shuzo Watanabe, Tokyo (JP)

(73) Assignees: IHI Corporation, Tokyo (JP); Electric Power Development Co., Ltd., Tokyo (JP)

( * ) Notice: Subject to any disclaimer, the term of this patent is extended or adjusted under 35 U.S.C. 154(b) by 361 days.

(21) Appl. No.: 12/920,549

(22) PCT Filed: Mar. 6, 2008

(86) PCT No.: PCT/JP2008/000469
§ 371 (c)(1),
(2), (4) Date: Nov. 8, 2010

(87) PCT Pub. No.: WO2009/110031
PCT Pub. Date: Sep. 11, 2009

(65) Prior Publication Data
US 2011/0048295 A1    Mar. 3, 2011

(51) Int. Cl.
*F23B 90/00*    (2011.01)
(52) U.S. Cl.
USPC .......... 110/341; 110/204; 110/205; 110/344; 110/345; 110/347; 110/348
(58) Field of Classification Search
USPC .......................... 110/341, 204, 108
See application file for complete search history.

(56) References Cited

U.S. PATENT DOCUMENTS

| | | | | |
|---|---|---|---|---|
| 3,043,525 A | * | 7/1962 | Gilbert | 241/30 |
| 3,519,254 A | * | 7/1970 | Putman | 432/21 |

(Continued)

FOREIGN PATENT DOCUMENTS

| | | |
|---|---|---|
| GB | 702865 | 1/1954 |
| JP | 4-244504 A | 9/1992 |

(Continued)

OTHER PUBLICATIONS

The Extended European Search Report issued Apr. 12, 2012, in Application No. / Patent No. 08720355.0-2301/ 2251596 PCT/JP2008000469.

(Continued)

*Primary Examiner* — Kenneth Rinehart
*Assistant Examiner* — Bao D Nguyen
(74) *Attorney, Agent, or Firm* — Oblon, Spivak, McClelland, Maier & Neustadt, L.L.P.

(57) ABSTRACT

Provided are fuel feed means 3, an air separation unit 6 air feed means 7, a combustion furnace 11 with a burner 9 for combustion, an exhaust gas line 14 for leading an exhaust gas from the combustion furnace 11 to outside of the combustion furnace 11, exhaust gas treatment means 20a and 20b included in the exhaust gas line 14, and a recirculation line 15 for circulating a portion of the exhaust gas at least exhaust gas treatment means 20a and 20b for recirculation of a portion of the exhaust gas at least dust-removed by the exhaust gas treatment means 20a and 20b to the burner. Further provided are exhaust gas capture means 18 for taking out carbon dioxide gas from a remaining non-recirculating exhaust gas, and carbon dioxide gas feed means 33, 40 and 46 for introducing carbon dioxide gas to equipments 10, 20a and 20b of the oxyfuel combustion boiler facility.

9 Claims, 5 Drawing Sheets

U.S. PATENT DOCUMENTS

| | | | | | |
|---|---|---|---|---|---|
| 4,411,204 | A | * | 10/1983 | Hamilton | 110/347 |
| 4,441,435 | A | * | 4/1984 | Miyamoto | 110/245 |
| 4,528,918 | A | * | 7/1985 | Sato et al. | 110/347 |
| 4,781,576 | A | * | 11/1988 | Dewitz | 431/186 |
| 5,179,903 | A | * | 1/1993 | Abboud et al. | 110/345 |
| 5,406,786 | A | * | 4/1995 | Scharpf et al. | 60/775 |
| 5,450,801 | A | * | 9/1995 | Abboud | 110/203 |
| 5,501,159 | A | * | 3/1996 | Stevers et al. | 110/188 |
| 5,626,085 | A | * | 5/1997 | Donais et al. | 110/188 |
| 6,024,029 | A | * | 2/2000 | Clark | 110/216 |
| 6,189,461 | B1 | * | 2/2001 | Miyazawa et al. | 110/345 |
| 6,190,160 | B1 | * | 2/2001 | Hibon et al. | 431/12 |
| 6,216,611 | B1 | * | 4/2001 | Baudhuin | 110/233 |
| 6,401,633 | B2 | * | 6/2002 | Baudhuin | 110/233 |
| 6,843,185 | B1 | * | 1/2005 | Taylor | 110/261 |
| 6,907,845 | B2 | * | 6/2005 | Krebs | 122/7 R |
| 6,935,251 | B2 | * | 8/2005 | Marin et al. | 110/204 |
| 7,261,046 | B1 | * | 8/2007 | Rettig et al. | 110/345 |
| 7,475,646 | B2 | * | 1/2009 | Widmer et al. | 110/343 |
| 7,500,437 | B2 | * | 3/2009 | Lefebvre et al. | 110/186 |
| 8,038,746 | B2 | * | 10/2011 | Clark | 48/61 |
| 8,209,040 | B2 | * | 6/2012 | Sekiai et al. | 700/47 |
| 2003/0000436 | A1 | * | 1/2003 | Havlena | 110/347 |
| 2004/0159270 | A1 | * | 8/2004 | Booher | 110/341 |
| 2005/0058958 | A1 | * | 3/2005 | Kobayashi et al. | 431/10 |
| 2005/0132941 | A1 | * | 6/2005 | Taylor | 110/265 |
| 2005/0257721 | A1 | * | 11/2005 | Okazaki et al. | 110/204 |
| 2007/0250215 | A1 | * | 10/2007 | Jia et al. | 700/274 |
| 2008/0160464 | A1 | * | 7/2008 | Ghani et al. | 431/9 |
| 2008/0168016 | A1 | * | 7/2008 | Sekiai et al. | 706/46 |
| 2008/0184621 | A1 | * | 8/2008 | Clark | 48/76 |
| 2008/0286707 | A1 | * | 11/2008 | Panesar et al. | 431/10 |
| 2009/0031933 | A1 | | 2/2009 | Ookawa et al. | |
| 2009/0183660 | A1 | * | 7/2009 | Wessel | 110/188 |
| 2009/0272300 | A1 | | 11/2009 | Yamada et al. | |
| 2010/0031858 | A1 | * | 2/2010 | Orii et al. | 110/188 |
| 2010/0224108 | A1 | * | 9/2010 | Kamikawa et al. | 110/188 |
| 2010/0236500 | A1 | * | 9/2010 | Douglas et al. | 122/22 |

FOREIGN PATENT DOCUMENTS

| | | |
|---|---|---|
| JP | 5 26409 | 2/1993 |
| JP | 5-26409 A | 2/1993 |
| JP | 5-168853 A | 7/1993 |
| JP | 5-172305 A | 7/1993 |
| JP | 7-318016 A | 12/1995 |
| JP | 11-118102 A | 4/1999 |
| JP | 2001 153303 | 6/2001 |
| JP | 2001-153303 A | 6/2001 |
| JP | 2001-235103 A | 8/2001 |
| JP | 2001-336736 A | 12/2001 |
| JP | 2007 147161 | 6/2007 |
| WO | WO 2006/107209 A1 | 10/2006 |
| WO | WO 2007/061106 A1 | 5/2007 |
| WO | WO 2007/061107 A1 | 5/2007 |

OTHER PUBLICATIONS

U.S. Appl. No. 12/920,704, filed Sep. 2, 2010, Terushita, et al.
U.S. Appl. No. 12/920,542, filed Sep. 1, 2010, Terushita, et al.
U.S. Appl. No. 12/920,843, filed Sep. 3, 2010, Terushita, et al.
U.S. Appl. No. 12/920,602, filed Sep. 2, 2010, Terushita, et al.
U.S. Appl. No. 12/920,738, filed Sep. 2, 2010, Terushita, et al.

* cited by examiner

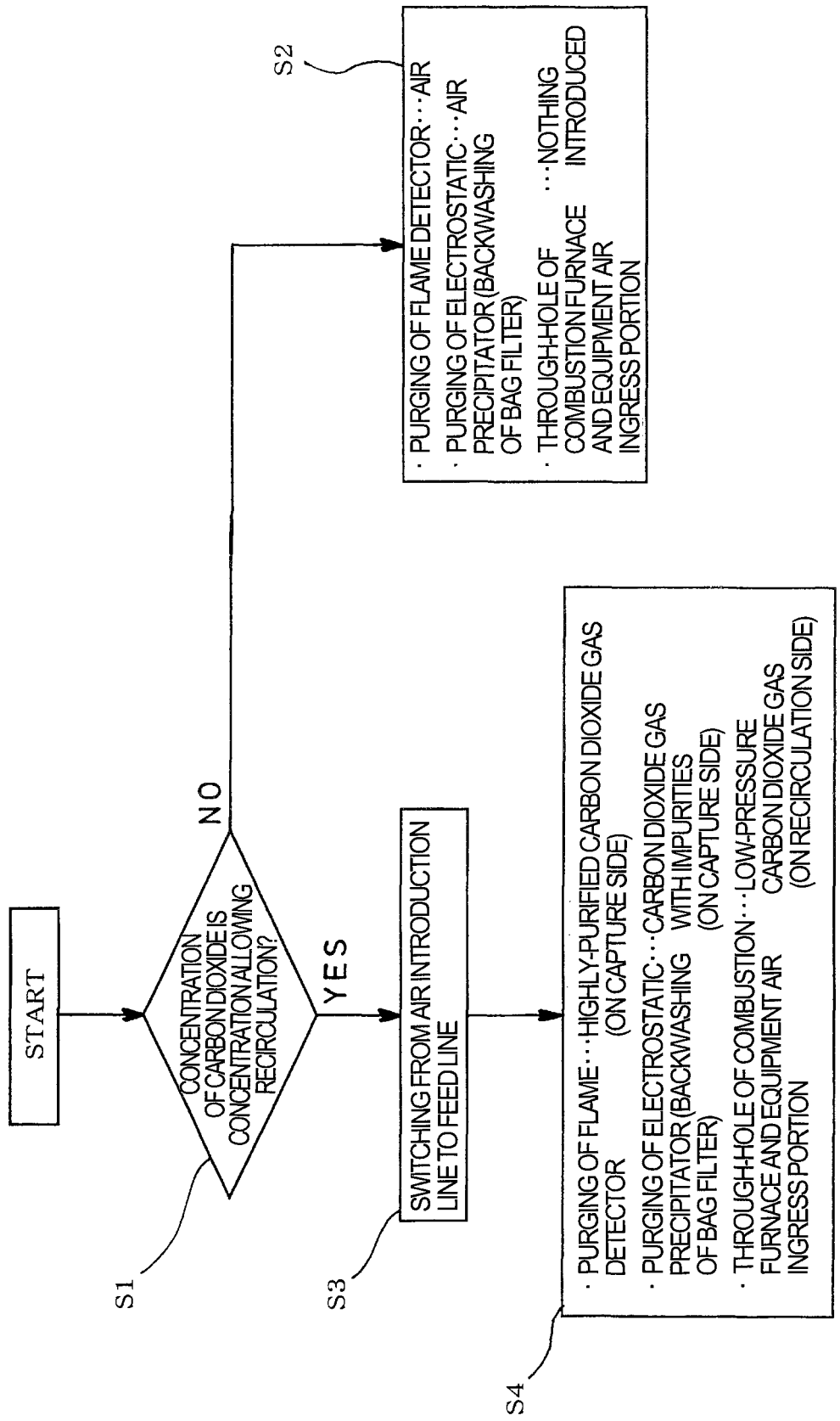

METHOD AND FACILITY FOR FEEDING CARBON DIOXIDE TO OXYFUEL COMBUSTION BOILER

TECHNICAL FIELD

The present invention relates to a method and a facility for feeding carbon dioxide to an oxyfuel combustion boiler.

BACKGROUND ART

Nowadays, it has been desired to reduce emission of greenhouse gases such as carbon dioxide to prevent global warming and technologies are being developed for capturing carbon dioxide in an exhaust gas from an oxyfuel combustion boiler for storage in ocean or to underground formation.

A facility with such oxyfuel combustion boiler comprises mills for pulverizing coal, an air separation unit which separates oxygen from other nitrogen-rich gas, a forced draft fan (FDF) for air feed capable of forcing ambient air to inside of the system, a combustion furnace (boiler) which introduces, through an introducing line, the fuel from the mill and air from the forced draft fan or recirculation gas and oxygen from the air separation unit for combustion, an exhaust gas line which guides an exhaust gas from the combustion furnace to outside, an air preheater incorporated in the exhaust gas line, a dust collector for exhaust gas treatment incorporated in the exhaust gas line downstream of the air preheater and a recirculation line branched from the exhaust gas line and connected to the introduction line through the air preheater.

The combustion furnace has an inlet-side wind box which receives the air from the forced draft fan and the oxygen from the air separation unit. Arranged in the wind box is a burner which receives the pulverized coal from the mill.

For initial start-up of the facility with the oxyfuel combustion boiler, the burner is supplied with air through the introduction line, etc., to perform normal combustion with air, the resultant exhaust gas being entirely led to the exhaust gas line. In this case, the combustion with air will bring about the exhaust gas which contains about 70% of nitrogen and the rest comprising carbon dioxide, $SO_X$ and vapor; the exhaust gas is subjected to an exhaust gas treatment by the dust collector, etc., and emitted to the atmosphere with the components retained below environmental emission standard values. Subsequently, when collected heat of the combustion furnace reaches a designed value, a portion of the exhaust gas subjected to the exhaust gas treatment by the dust collector, etc., is recirculated as recirculation gas through the recirculation line and the oxygen from the air separation unit is mixed with the recirculation gas and fed to the wind box to perform combustion with the burner.

Thus, nitrogen contained in the air is no longer supplied and the concentration of nitrogen in the exhaust gas from the combustion furnace is gradually reduced as the concentration of carbon dioxide is increased. Subsequently, when the concentration of carbon dioxide becomes substantially constant, the emission to the atmosphere is terminated to perform steady operation while the exhaust gas is recirculated through the recirculation line and carbon dioxide is captured through a cooler as needed.

A facility using a boiler may include a seal as constructional detail on a top wall of the combustion furnace to prevent infiltration of combustion ash, etc. (see, for example, Patent Literatures 1 and 2).

[Patent Literature 1] JP 11-118102A
[Patent Literature 2] JP 2001-153303A

SUMMARY OF INVENTION

Technical Problems

However, during an operation in such boiler facility, a combustion furnace, a dust collector, a recirculation line, etc. have negative pressures so that outside air may flow inside through gaps existing in the equipments of the boiler facility, disadvantageously resulting in lowering of concentration of the recirculating carbon dioxide.

The invention was made in view of the above and has its object to provide a method and a facility for feeding carbon dioxide to an oxyfuel combustion boiler which suppress air ingress into equipments of boiler facility

Solution to Problems

The invention is directed to a method for feeding carbon dioxide to an oxyfuel combustion boiler wherein air is separated by an air separation unit into oxygen and the other nitrogen-rich gas; the oxygen obtained by the air separation unit and fuel are burned by a burner of a combustion furnace; at least dust removal is conducted for resultant exhaust gas from the combustion furnace; and then, a portion of the exhaust gas is recirculated as a recirculating gas to said combustion furnace and the remaining non-recirculating exhaust gas is discharged, characterized in that a carbon dioxide gas is taken out from the remaining non-recirculating exhaust gas and is introduced into an equipment of an oxyfuel combustion boiler facility for purging.

In the method for feeding carbon dioxide to the oxyfuel combustion boiler of the invention, preferably, a portion of said recirculating recirculation gas is branched as a carbon dioxide gas and is introduced into the equipment of the oxyfuel combustion boiler facility for sealing.

In the method for feeding carbon dioxide to the oxyfuel combustion boiler of the invention, preferably, said remaining non-recirculating exhaust gas is separated by cooling into a highly-purified carbon dioxide gas not containing impurities and a carbon dioxide gas containing impurities, said highly-purified carbon dioxide gas not containing impurities being used for purging a flame detector of the combustion furnace, said carbon dioxide gas containing impurities being used for purging an insulator of an electrostatic precipitator or backwashing a filter of a bag filter.

In the method for feeding carbon dioxide to the oxyfuel combustion boiler of the invention, preferably, said carbon dioxide gas branched from the recirculating recirculation gas is introduced to at least one of a through-hole of the combustion furnace and an equipment air ingress portion.

The invention is directed to a facility for feeding carbon dioxide to an oxyfuel combustion boiler having fuel feed means, an air separation unit for separating air into oxygen and a nitrogen-rich gas, air feed means, a combustion furnace into which fuel from said fuel feed means and the oxygen or air from the air separation unit or from the air feed means is introduced through an introduction line to perform combustion with a burner, an exhaust gas line for leading an exhaust gas from the combustion furnace to outside of the combustion furnace, exhaust gas treatment means included in said exhaust gas line and a recirculation line for recirculation of a portion of the exhaust gas at least dust-removed by said exhaust gas treatment means to said burner, characterized by comprising exhaust gas capturing means for taking out a carbon dioxide gas from the remaining non-recirculating exhaust gas and carbon dioxide feed means for introducing said carbon dioxide gas to an equipment of the oxyfuel combustion boiler facility.

The facility for feeding carbon dioxide to the oxyfuel combustion boiler of the invention preferably comprises recirculation-side carbon dioxide feed means for branching a portion of the recirculating recirculation gas as a carbon dioxide gas to introduce said carbon dioxide gas to the equipment of the oxyfuel combustion boiler facility.

In the facility for feeding carbon dioxide to the oxyfuel combustion boiler of the invention, preferably, the exhaust gas capturing means includes cooling means for separating the remaining non-recirculating exhaust gas into a highly-purified carbon dioxide gas not containing impurities and a carbon dioxide gas containing impurities, said carbon dioxide feed means including a line for use of said highly-purified carbon dioxide gas not containing impurities to purge a flame detector of the combustion furnace and a line for use of said carbon dioxide gas containing impurities to purge an insulator of an electrostatic precipitator or to backwash a filter of a bag filter.

In the facility for feeding carbon dioxide to the oxyfuel combustion boiler of the invention, preferably, said recirculation-side carbon dioxide feed means includes a line for introducing the carbon dioxide gas branched from said recirculating recirculation gas to at least one of a through-hole of the combustion furnace and an equipment air ingress portion.

Advantageous Effects of Invention

According to a method and a facility for feeding carbon dioxide to an oxyfuel combustion boiler, carbon dioxide is taken out from the remaining non-recirculating exhaust gas and is introduced to equipments in an oxyfuel combustion boiler facility, so that an excellent effect can be achieved which suppresses air ingress from outside to inside into the equipments in the boiler facility to prevent the lowering of concentration of carbon dioxide in a recirculating exhaust gas.

BRIEF DESCRIPTION OF DRAWINGS

FIG. 7 is a flowchart of controlling feed of a carbon dioxide gas in the embodiment of the invention.

Figure 1:
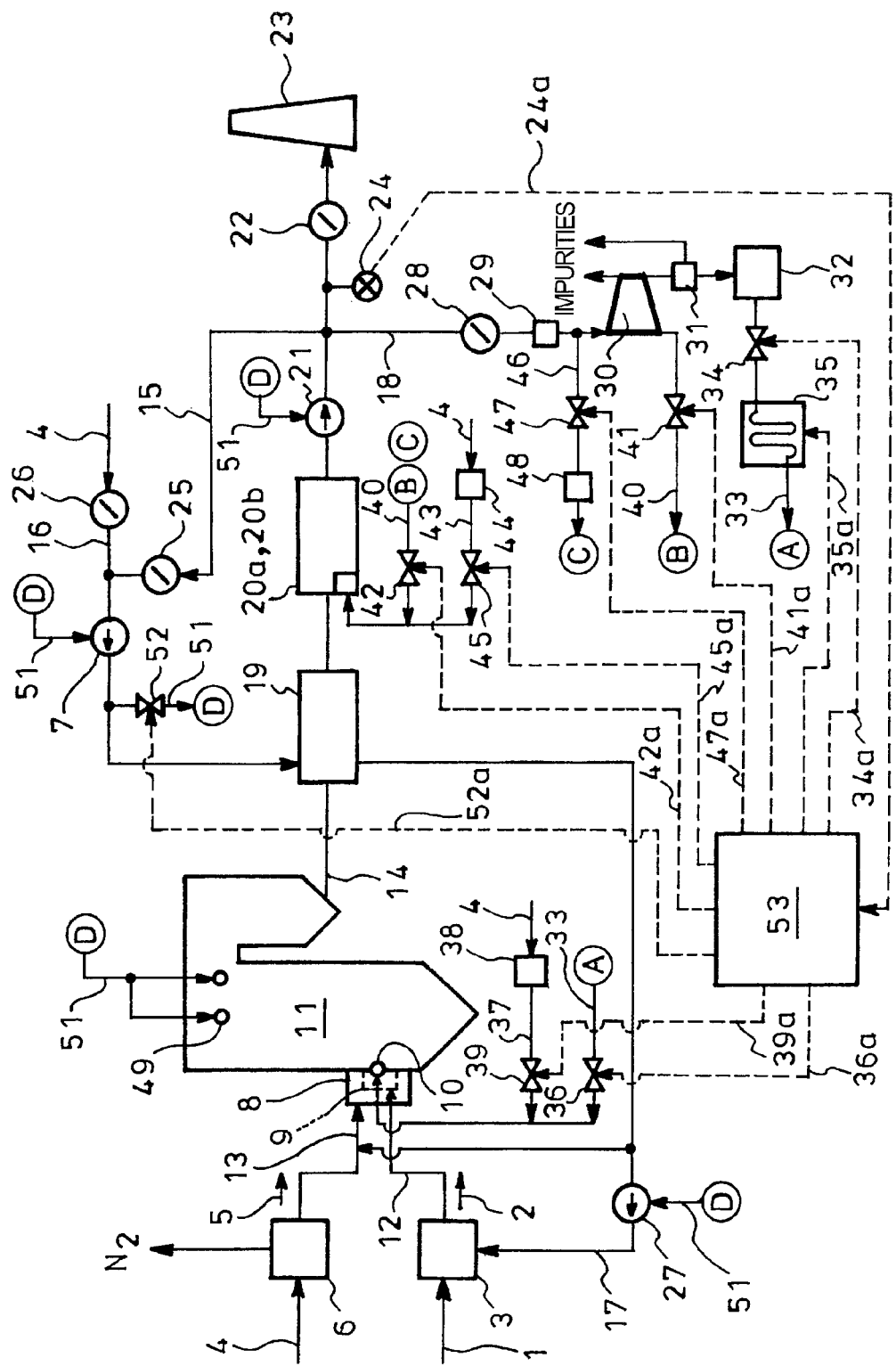
FIG. 1 is a block diagram of a configuration of an embodiment of the invention.

REFERENCE SIGNS LIST 2 pulverized coal
3 mill (fuel feed means)
4 air
5 oxygen
6 air separation unit
7 forced draft fan (air feed means, equipment)
9 burner
10 flame detector (equipment)
11 combustion furnace
12 pulverized-coal introduction line
13 oxygen introduction line
14 exhaust gas line
15 recirculation line
16 air intake line (air feed means)
18 exhaust gas capture line (exhaust gas capturing means)
20a electrostatic precipitator (exhaust gas treatment means, equipment)
20b bag filter (exhaust gas treatment means, equipment)
21 induced draft fan (equipment)
27 primary air fan (equipment)
29 first cooler (cooling means)
31 second cooler (cooling means)
33 first feed line (carbon dioxide gas feed means)
40 second feed line (carbon dioxide gas feed means)
46 third feed line (carbon dioxide gas feed means)
49 through-hole
50 air ingress portion
51 recirculation-side feed line (recirculation-side carbon dioxide gas feed means)
58 supporting insulator (insulator)

DESCRIPTION OF EMBODIMENT

An embodiment of the invention will be described with reference to the accompanying drawings.

FIG. 1 is a block diagram of the embodiment in the invention. A facility for feeding carbon dioxide to an oxyfuel combustion boiler of the invention comprises a mill 3 as fuel feed means which pulverizes coal 1 as fuel into pulverized coal 2, an air separation unit 6 which separates air 4 into oxygen 5 and the other nitrogen-rich gas, a forced draft fan 7 (FDF) as air feed means capable of forcing the air 4 or a recirculation gas and a combustion furnace 11 with a wind box 8 in which a burner 9 and a flame detector 10 are arranged.

The combustion furnace 11 is connected on its inlet side to a pulverized-coal introduction line 12 for introduction of the pulverized coal 2 from the mill 3 to the burner 9 as well as an oxygen introduction line 13 for introduction of the oxygen 5 from the air separation unit 6 to the wind box 8. The combustion furnace 11 is connected on its outlet side to an exhaust gas line 14 for introduction of resultant exhaust gas from the combustion to outside. The oxygen introduction line 13 is connected with a recirculation line 15 branched from the exhaust gas line 14 to return the exhaust gas through the forced draft fan 7, and the recirculation line 15 is connected with an air intake line 16 which takes in the air 4 from outside and is connected with a branch line 17 connected to the mill 3. The exhaust gas line 14 is provided with an exhaust gas capture line 18 as exhaust gas capture means for taking out carbon dioxide gas from the exhaust gas.

The exhaust gas line 14 is equipped with an air preheater 19 for heating of the recirculating gas in the recirculation line 15, an electrostatic precipitator 20a or a bag filter 20b (bug filter) as exhaust gas treatment means located downstream of the air preheater 19, an induced draft fan 21 (IDF) located downstream of the exhaust gas treatment means and a switch 22 on the exhaust gas side located downstream of the induced draft fan 21, and a stack 23 is arranged further downstream to emit the exhaust gas to the atmosphere. The exhaust gas line 14 is provided with a carbon dioxide concentration monitor 24 which detects the concentration of carbon dioxide in the exhaust gas between the induced draft fan 21 and the switch 22 and has a branch point formed as a start point of the recirculation line 15. The carbon dioxide concentration monitor 24 may be disposed upstream of the branch point to the recirculation line 15 and its arrangement location is not particularly limited as long as being located downstream of the exhaust gas treatment means. The exhaust gas treatment means may include a deNO$_x$, a deSO$_x$ and the like (not shown) downstream of the electrostatic precipitator 20a, etc.

The recirculation line 15 is equipped with a switch 25 on the recirculation side located upstream of the forced draft fan 7 and connects the air intake line 16 between the switch 25 and the forced draft fan 7, and the air intake line 16 is equipped with a switch 26 on the air intake side. The recirculation line 15 is branched to the branch line 17 downstream of the air preheater 19 and the branch line 17 is provided with a primary air fan 27 (PAF) which sends the air 4 and the recirculation gas with pressure.

The exhaust gas line 14 is branched to the exhaust gas capture line 18 between the induced draft fan 21 and the switch 22, and the exhaust gas capture line 18 is equipped with a switch 28 on the capture side, a first cooler 29 as cooling means located downstream of the switch 28, a compressor 30 located downstream of the first cooler 29, a second cooler 31 as cooling means located downstream of the compressor 30 and a storage vessel 32 located downstream of the second cooler 31.

The storage vessel 32 is equipped with a first feed line 33 as carbon dioxide feed means connected to the flame detector 10 of the combustion furnace 11, and the first feed line 33 is equipped with a first flow rate adjuster 34 located downstream of the storage vessel 32, a vaporizer 35 located downstream of the first flow rate adjuster 34 and a switch 36 on the carbon dioxide gas side located downstream of the vaporizer 35. The first feed line 33 is equipped with a first air introduction line 37 capable of introducing the air 4 from outside air between the switch 36 and the flame detector 10, and the first air introduction line 37 is equipped with a compressor 38 located on the outside air side and a switch 39 on the air side located downstream of the compressor 38. In FIG. 1, the first feed line 33 is shown as communicating with the switch 36 from the vaporizer 35 via reference numeral A.

A second feed line 40 as carbon dioxide feed means connected to the electrostatic precipitator 20a or the bag filter 20b is equipped on the output side of the compressor 30 of the exhaust gas capture line 18, and the second feed line 40 is equipped with a second flow rate adjuster 41 located on the compressor side and a switch 42 on the dust collector side located downstream of the second flow rate adjuster 41. The second feed line 40 is equipped with a second air introduction line 43 capable of introducing the air 4 from outside air between the switch 42 and the electrostatic precipitator 20a or the bag filter 20b, and the second air introduction line 43 is equipped with a compressor 44 located on the outside air side and a switch 45 on the air side located downstream of the compressor 44. In FIG. 1, the second feed line 40 is shown as communicating with the switch 42 from the second flow rate adjuster 41 via reference numeral B.

The exhaust gas capture line 18 between the compressor 30 and a first cooler 29 is equipped with a third feed line 46 as carbon dioxide feed means flowing into the second feed line 40 before the switch 42 on the dust collector side, and the third feed line 46 is equipped with a third flow rate adjuster 47 located on the first cooler side and a small compressor 48 located downstream of the third flow rate adjuster 47. In FIG. 1, the third feed line 46 is shown as communicating with the switch 42 on the dust collector side from the compressor 48 via reference numeral C.

The recirculation line 15 between the forced draft fan 7 and the air preheater 19 is equipped with a recirculation-side feed line 51 as carbon dioxide feed means connected to at least one of a through-hole 49 of the combustion furnace 11 and an equipment air ingress portion 50 (see FIG. 6), and the recirculation-side feed line 51 is equipped with a fourth flow rate adjuster 52. In FIG. 1, the recirculation-side feed line 51 is shown as communicating with the through-hole 49 of the combustion furnace 11 and the equipment air ingress portion 50 from the fourth flow rate adjuster 52 via reference numeral D.

The first feed line 33, the second feed line 40, the third feed lien 46, and the recirculation-side feed line 51 are connected to a controller 53 such that open/close of the lines can be controlled, and the controller 53 executes a process in response to a concentration signal 24a from the carbon dioxide concentration monitor 24. For the first feed line 33, the controller 53 sends an adjustment signal 34a to the first flow rate adjuster 34, a drive signal 35a to the vaporizer 35, a switch signal 36a to the switch 36 on the flame detector side, and a switch signal 39a to the switch 39 on the air side. For the second feed line 40 and the third feed line 46, the controller 53 also sends an adjustment signal 41a to the second flow rate adjuster 41, an adjustment signal 47a to the third flow rate adjuster 47, a switch signal 42a to the switch 42 on the dust collector side and a switch signal 45a to the switch 45 on the air side. For the recirculation-side feed line 51, the controller 53 further sends an adjustment signal 52a to the fourth flow rate adjuster 52.

Figure 2:
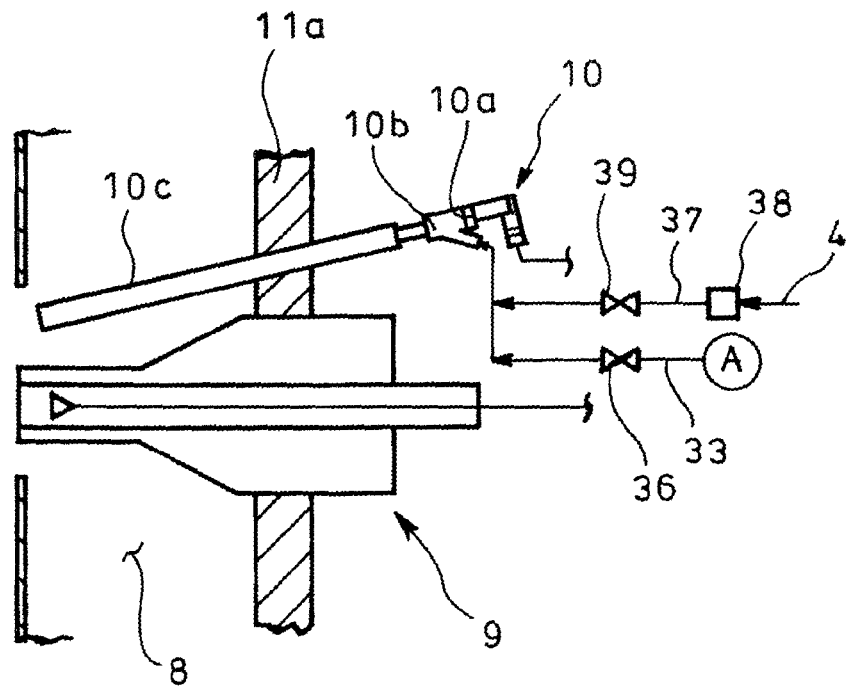
FIG. 2 is a schematic diagram of a structure for purging a flame detector.

The flame detector 10 connected to the first feed line 33 includes an eyepiece 10a arranged toward the flame of the burner 9, a carbon dioxide gas introducing unit 10b on the eyepiece 10a and a tubular guide 10c extending from the introducing unit 10b and penetrating a furnace wall 11a of the combustion furnace 11 to the vicinity of the tip of the burner 9 as shown in FIG. 2, and the introducing unit 10b is connected to the first feed line 33 and the first air introduction line 37 to purge the space between the front face of the eyepiece 10a and the flame of the burner 9 and this allows the eyepiece 10a of the flame detector 10 to sense the flames of the burner 9.

Figure 3:
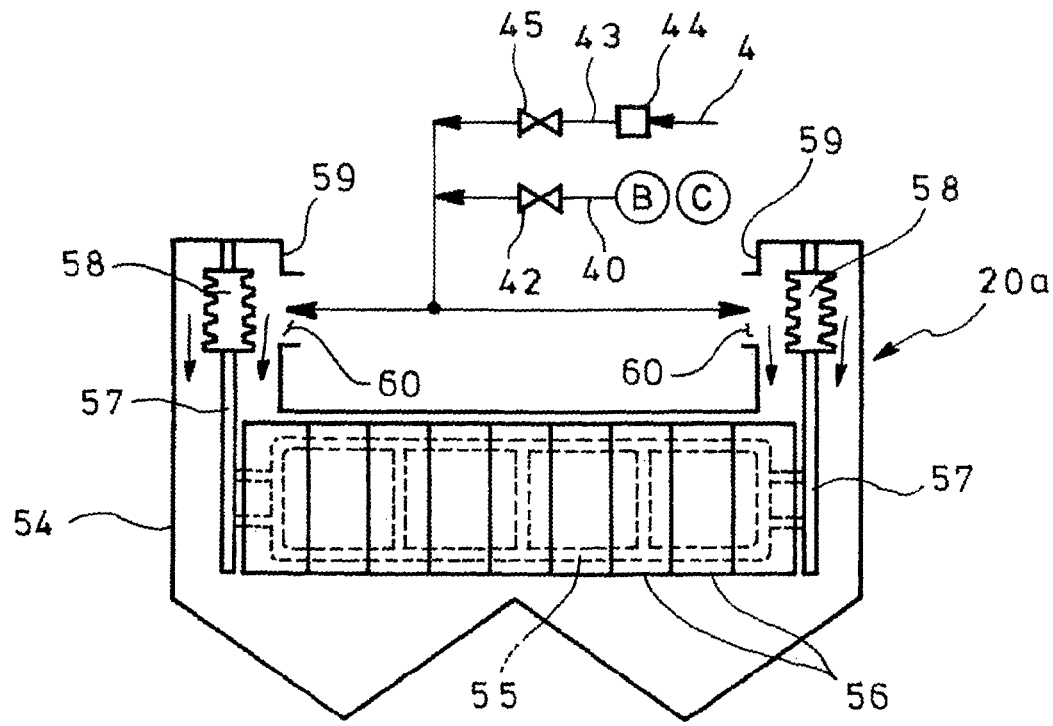
FIG. 3 is a schematic diagram of a structure for purging an electrostatic precipitator.

The electrostatic precipitator 20a connected to the second feed line 40 or the third feed line 46 comprises a casing 54 which takes in the exhaust gas, a plurality of discharge electrodes 55 disposed within the casing 54 and dust collecting plates 56 arranged alternately with the discharge electrodes 55 within the casing 54 as shown in FIG. 3, and applies electric charge to dust in the exhaust gas with corona discharge from the discharge electrodes 55 to attract and collect the dust with the dust collecting plates 56. The discharge electrodes 55 are supported by discharge electrode supporting plates 57; the discharge electrode supporting plates 57 are arranged with supporting insulators 58 made of an insulating material; and side walls 59 in the vicinity of the supporting insulators 58 are connected to the second feed line 40 and the second air introduction line 43 through openings 60 to introduce a carbon dioxide gas or air toward the supporting insulators 58.

Figure 4:
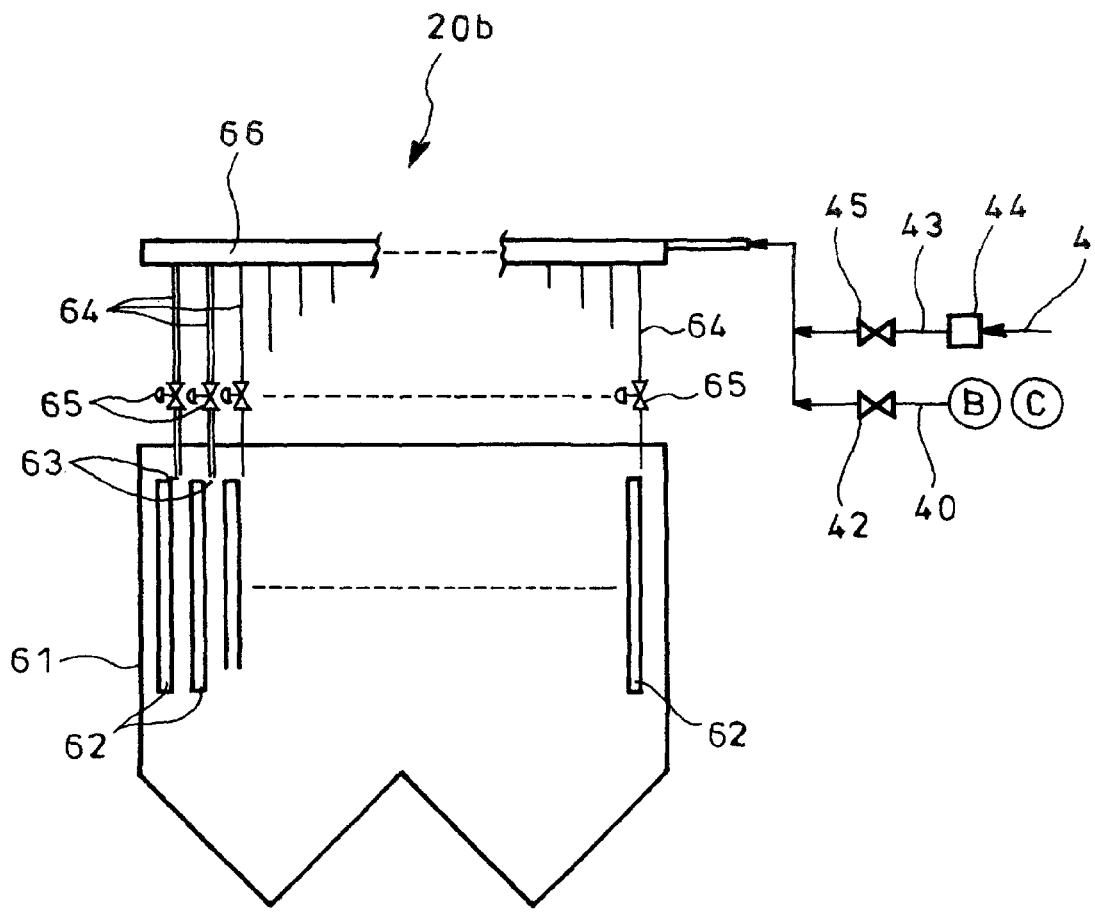
FIG. 4 is a schematic diagram of a structure for purging a bag filter.

The feed destination connected to the second feed line 40 or the third feed line 46 may be the bag filter 20b (bug filter) instead of the electrostatic precipitator 20a and the bag filter 20b comprises a casing 61 which takes in the exhaust gas, a plurality of filters 62 disposed within the casing 61 to capture dust, a plurality of filter backwash feed pipes 64 which locate feed ports 63 at the upper portions of the filters 62, pulse valves 65 on the filter backwash feed pipes 64 to periodically open/close flow passages, and a collecting pipe 66 connected to the plural filter backwash feed pipes 64 and having carbon dioxide or air introduced from the second feed line 40 or the second air introduction line 43 as shown in FIG. 4, and the carbon dioxide gas or air is introduced into the filter backwash feed pipes 64 and the carbon dioxide gas or air is periodically ejected by the pulse valves 65 to backwash the filters 62.

Figure 5:
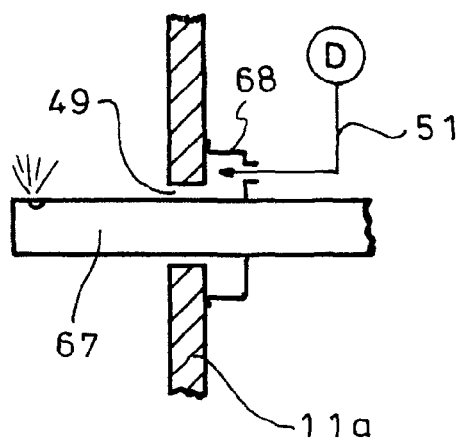
FIG. 5 is a schematic diagram of a structure for sealing a through-hole of a combustion furnace.
Figure 6:
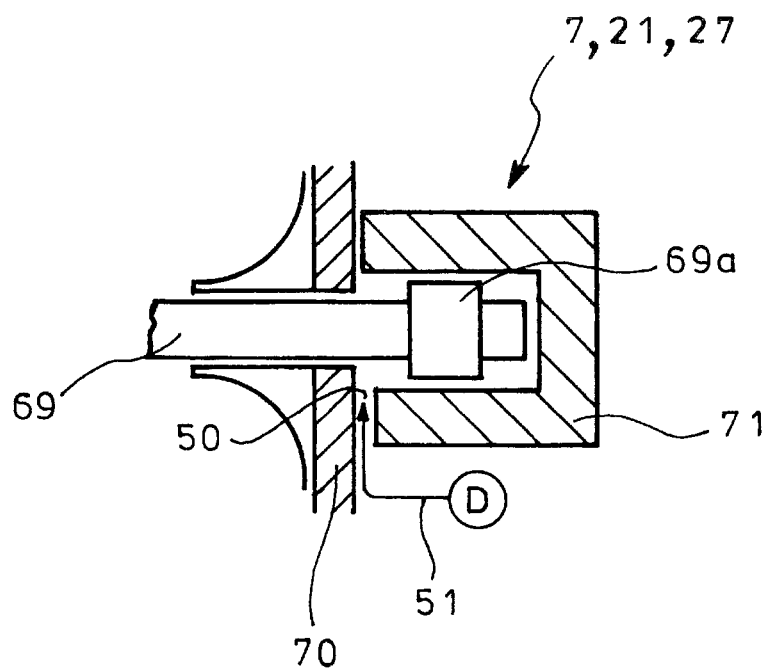
FIG. 6 is a schematic diagram of a structure for sealing an air ingress portion in an equipment.

The through-hole 49 of the combustion furnace 11 connected to the recirculation-side feed line 51 may be formed between the furnace wall 11a of the combustion furnace 11 and a soot blower 67, by way of example, as shown in FIG. 5, and a seal 68 connected to the exterior surface of the furnace wall 11a and the soot blower 67 is arranged on the outward side of the through-hole 49 to introduce the carbon dioxide gas through the recirculation-side feed line 51 into the seal 68 to seal the through-hole 49. The through-hole 49 of the combustion furnace 11 is not limited to the through-hole between the furnace wall 11a of the combustion furnace 11 and the soot blower 67, may be a through-hole formed between a top wall (not shown) of the combustion furnace 11 and an inserted object (not shown) such as a tube, and is not particularly limited as long as a through-hole is formed in the combustion furnace 11. The equipment air ingress portion 50 connected to the recirculation-side feed line 51 is a gap between a rotating shaft 69 disposed on the forced draft fan 7, the induced draft fan 21, the primary air fan 27, etc., and a side wall 70, by way of example, as shown in FIG. 6, and a seal structure 71 disposed on the side wall 70 to cover a bearing 69a for the rotating shaft 69 is arranged on the outward side of the gap to introduce the carbon dioxide gas through the recirculation-side feed line 51 into the seal structure 71 to seal the gap. The equipment air ingress portion 50 is not limited to the forced draft fan 7, the induced draft fan 21, and the primary air fan 27 and is not particularly limited as long as the air ingress portion is a constituent element of an equipment that may take in air from outside air while a negative pressure is generated inside the exhaust gas line 14, the recirculation line 15, the branch line 17, etc.

The operation of the embodiment of the invention will be described.

When the facility with the oxyfuel combustion boiler is started up, the switch 26 on the air intake side and the switch 22 on the exhaust gas side are opened and the switch 25 on the recirculation side is closed to feed the air 4 from the air intake line 16 through the introduction line 13, etc., to the burner 9 to perform normal combustion with air, and the exhaust gas is entirely led to the exhaust gas line 14 and emitted to the outside from the stack 23 through the air preheater 19, electrostatic precipitator 20a, etc. The concentration of carbon dioxide in the exhaust gas is made less than a predetermined concentration below which the recirculation of the exhaust gas is prohibited (e.g., less than 50% of the exhaust gas).

Subsequently, the carbon dioxide concentration monitor 24 of the exhaust gas line 14 detects the concentration of carbon dioxide and sends the concentration signal 24a to the controller 53; the controller 53 determines whether the concentration of carbon dioxide is a concentration allowing the recirculation (step S1 in FIG. 7); and if it is determined that the concentration of carbon dioxide is less than the predetermined concentration (NO at step S1 in FIG. 7), the switch 39 on the air side is opened and the switch 36 on the carbon dioxide gas side is closed in the first feed line 33 and the first air introduction line 37 to introduce the air 4 from the first air introduction line 37 to the introducing unit 10b of the flame detector 10 to purge the flame detector 10 (step S2 in FIG. 7). The switch 45 on the air side is opened and the switch 42 on the carbon dioxide gas side is closed in the second feed line 40, the third feed line 46 and the second air introduction line 43 to introduce the air 4 from the second air introduction line 43 to the electrostatic precipitator 20a to purge the supporting insulators 58 of the electrostatic precipitator 20a (step S2 in FIG. 7). If the bag filter 20b is arranged instead of the electrostatic precipitator 20a, the air 4 is introduced from the second air introduction line 43 to backwash the filters 62 of the bag filter 20b in the same way. In the recirculation-side feed line 51, the fourth flow rate adjuster 52 is closed so that nothing is introduced into the through-hole 49 of the combustion furnace 11 and the equipment air ingress portion 50 (step S2 in FIG. 7). Although the air 4 flows into the through-hole 49 of the combustion furnace 11 and the equipment air ingress portion 50 from the outside to the inside, the exhaust gas is not recirculated so that no problem occurs due to the lowering of the carbon dioxide concentration in the exhaust gas in association with the inflow of the air 4.

When the collected heat of the combustion furnace 11 reaches the predetermined value and the air combustion is switched to the oxyfuel combustion (carbon dioxide recovering operation), the switch 25 on the recirculation side is opened and the switch 26 on the air intake side is closed to recirculate a portion of the exhaust gas through the recirculation line 15 to the introduction line, and the oxygen 5 fed from the air separation unit 6 is mixed with the recirculation gas and fed to the wind box 8 to perform combustion with the burner 9. By feeding the oxygen 5, the concentration of nitrogen in the exhaust gas from the combustion furnace 11 is gradually reduced and the concentration of carbon dioxide is increased and, when the concentration of carbon dioxide becomes substantially constant, the switch 22 on the exhaust gas side is closed to terminate the emission to outside air to achieve the carbon dioxide recovering operation while the exhaust gas is recirculated through the recirculation line 15.

When the carbon dioxide recovering operation is performed in the facility with the oxyfuel combustion boiler, the switch 28 on the capture side is opened to activate the exhaust gas capture line 18; the exhaust gas is cooled by the first cooler 29 to form a carbon dioxide gas and compressed by the compressor 30 to remove impurities such as moisture; and the carbon dioxide gas is further cooled by the second cooler 31 into liquefaction to remove impurities such as $O_2$, $NO_x$, Ar, $SO_x$ and $N_2$ and is stored in the storage vessel 32.

If it is determined (YES at step S1 in FIG. 7) with the carbon dioxide concentration monitor 24 that the concentration of carbon dioxide is the predetermined concentration or more (e.g., 50% or more in the exhaust gas), in the first feed line 33 and the first air introduction line 37, the controller 53 closes the switch 39 on the air side and opens the switch 36 on the carbon dioxide gas side and the first flow rate adjuster 34 for switching from the first air introduction line 37 to the first feed line 33 (step S3 in FIG. 7), actuates the vaporizer 35 to vaporize a portion of the liquefied carbon dioxide in the storage vessel 32 to generate a highly-purified carbon dioxide gas not containing impurities which is introduced through the first feed line 33 to the flame detector 10 to purge the flame detector 10 (step S4 in FIG. 7). The carbon dioxide gas has a carbon dioxide concentration of 99% or more, contains no moisture and has a pressure (total pressure) of 0.1 MPa or more and below 1.0 MPa, preferably 0.5 MPa or more and below 0.8 MPa. The storage vessel 32 may be filled with liquefied carbon dioxide in advance before activating the exhaust gas capture line 18 and, in this case, the liquefied carbon dioxide in the storage vessel 32 may be vaporized to feed carbon dioxide even before carbon dioxide is liquefied by activating the exhaust gas capture line 18.

If the compressor 30 is activated, the controller 53 closes the switch 45 on the air side and the third flow rate adjuster 47 and opens the switch 42 on the carbon dioxide side and the second flow rate adjuster 41 in the second feed line 40, the third feed line 46 and the second air introduction line 43 for switching from the second air introduction line 43 to the second feed line 40 (step S3 in FIG. 7), sends the carbon dioxide gas with pressure by the compressor 30 and introduces the carbon dioxide gas containing impurities through the second feed line 40 into the electrostatic precipitator 20a to purge the supporting insulators 58 of the electrostatic precipitator 20a (step S4 in FIG. 7). If the bag filter 20b is disposed instead of the electrostatic precipitator 20a, the carbon dioxide gas is introduced from the second feed line 40 into the bag filter 20b to backwash the filters 62 of the bag filter 20b in the same way. The carbon dioxide gas from the second feed line 40 has a carbon dioxide concentration or 90% or more and below 99%, contains no moisture and has a pressure (total pressure) of 0.1 MPa or more and below 1.0 MPa, preferably 0.5 MPa or more and below 0.8 MPa. The electrostatic precipitator 20a or the bag filter 20b may be fed with a highly-purified carbon dioxide gas not containing impurities from the first feed line 33.

On the other hand, if the compression of the carbon dioxide gas is unnecessary and the compressor 30 is not activated, the switch 45 on the air side and the second flow rate adjuster 41 are closed and the switch 42 on the carbon dioxide side and the third flow rate adjuster 47 are opened for switching from the second air introduction line 43 to the third feed line 46 (step S3 in FIG. 7), and the carbon dioxide gas is pressurized by actuating a small compressor at the same time to introduce the carbon dioxide gas containing impurities through the third feed line 46 into the electrostatic precipitator 20a to purge the supporting insulators 58 of the electrostatic precipitator 20a (step S4 in FIG. 7). If the bag filter 20b is disposed instead of the electrostatic precipitator 20a, the carbon dioxide gas is introduced from the third feed line 46 into the bag filter 20b to backwash the filters 62 of the bag filter 20b in the same way. The carbon dioxide gas from the third feed line 46 has a carbon dioxide concentration of 50% or more and below 90%, contains impurities such as moisture and $NO_x$ and has a pressure (total pressure) of 0.1 MPa or more and below 1.0 MPa, preferably 0.5 MPa or more and below 0.8 MPa due to the pressurization by the compressor. The electrostatic precipitator 20a or the bag filter 20b may be fed with a highly-purified carbon dioxide gas not containing impurities from the first feed line 33 as in the case of the second feed line 40.

The controller 53 also opens the fourth flow rate adjuster 52 in the recirculation-side feed line 51 to introduce a low-pressure carbon dioxide gas into the through-hole 49 of the combustion furnace 11 and the equipment air ingress portions 50 for sealing (step S4 in FIG. 7). The carbon dioxide gas from the recirculation-side feed line 51 has a carbon dioxide concentration of 50% or more and below 80%, which is substantially the same as the recirculating exhaust gas, contains impurities such as moisture and $NO_x$ and has a pressure (total pressure) in the range of 1 kPa to 30 kPa, preferably in the range of 3 kPa to 10 kPa due to the forced draft fan 7, etc. The through-hole 49 of the combustion furnace 11, the equipment air ingress portions 50, etc., may be fed with a highly-purified carbon dioxide gas not containing impurities from the first feed line 33 or may be fed with a highly-purified carbon dioxide gas containing impurities from the second and third feed lines 40 and 46. The carbon dioxide gas may be introduced into all of the through-holes 49 of the combustion furnace 11 and the equipment air ingress portions 50 or may be introduced into one of the through-holes 49 of the combustion furnace 11 and the equipment air ingress portions 50 as long as the carbon dioxide gas is introduced into at least one location.

According to the embodiment, since carbon dioxide is taken out from the remaining non-recirculating exhaust gas through the exhaust gas capture line 18 in the state of the steady operation where the carbon dioxide gas recirculates, and the carbon dioxide gas is introduced through the first, second and third feed lines 33, 40 and 46 into the equipments of the oxyfuel combustion boiler facility for purging as above, the air ingress from the outside to the inside into the equipments of the boiler facility may be constrained to prevent the lowering in carbon dioxide concentration of the recirculating exhaust gas.

According to the embodiment, since a portion of the recirculating gas circulating through the recirculation-side feed line 51 is branched to form the carbon dioxide gas in the state of the steady operation where the carbon dioxide gas recirculates, and the carbon dioxide gas is introduced into the equipments of the oxyfuel combustion boiler facility for sealing, the air ingress from the outside to the inside into the equipments of the boiler facility may be constrained to prevent the lowering in carbon dioxide concentration of the recirculating exhaust gas.

In the embodiment, when a highly-purified carbon dioxide gas containing no moisture is separated from the remaining non-recirculating exhaust gas through the exhaust gas capture line 18 via the first and second coolers 29 and 31 and the compressor 30 and is used for purging the flame detector 10 of the combustion furnace 11, the lowering of carbon dioxide concentration may be prevented in the recirculating exhaust gas; the flame detector 10 may be prevented from being corrosioned because of the absence of moisture; the absence of impurities is maintained between the eyepiece 10a and the burner 9; and the flame of the burner 9 may be properly sensed. Since the carbon dioxide gas contains no moisture in the gas and the carbon dioxide concentration in the gas is 99% or more, no effect of impurities exists and since the pressure (total pressure) of the carbon dioxide gas is in the range of 0.1 MPa to 1.0 MPa, preferably in the range of 0.5 MPa to 0.8 MPa, the flame detector 10 may appropriately be purged. If the carbon dioxide concentration is less than 99%, the corrosion, etc., of the flame detector 10 may occur due to impurities such as moisture; if the pressure (total pressure) of carbon dioxide is below 0.1 MPa, it is problematic that the flame detector 10 is unable to be purged due to low pressure; and if the pressure (total pressure) of carbon dioxide is over 1.0 MPa, it is problematic that the pressure exceeds the pressure limit of and adversely affects the flame detector 10. When the pressure (total pressure) of the carbon dioxide gas is in the range of 0.5 MPa to 0.8 MPa, the sensor may be most preferably purged.

In the embodiment, when the carbon dioxide gas containing impurities is separated from the remaining non-recirculating exhaust gas through the exhaust gas capture line 18 via the first cooler 29, etc., and the carbon dioxide gas containing impurities is used for purging the supporting insulators 58 of the electrostatic precipitator 20a or backwashing the filters 62 of the bag filter 20b, the electric leakage due to the dust entering and attaching to the supporting insulators 58 may be constrained to prevent the supporting insulators 58 from being damaged by the electric leakage in the case of purging the electrostatic precipitator 20a and the usage of the air 4 may be reduced in the backwash to prevent the lowering of the carbon dioxide concentration in the case of being used for backwashing of the bag filter 20b. Since the second and third feed lines 40 and 46 are arranged in a switchable manner, the carbon dioxide gas may be used for purging the supporting insulators 58 of the electrostatic precipitator 20a or backwashing the filters 62 of the bag filter 20b even if the compressor 30 is not used for cost reduction. Since the carbon dioxide gas has the carbon dioxide concentration in the gas of 50% or more, which is equal to or greater than the concentration of the recirculating carbon dioxide gas, and the pressure (total pressure) of the carbon dioxide gas is in the range of 0.1 MPa to 1.0 MPa, preferably in the range of 0.5 MPa to 0.8 MPa, the carbon dioxide gas may be appropriately used for purging the insulators of the electrostatic precipitator 20a or backwashing the filters 62 of the bag filter 20b. If the carbon dioxide concentration is below 50%, the concentration of circulating carbon dioxide is reduced and adversely affects the steady operation; if the pressure (total pressure) of carbon dioxide is below 0.1 MPa, it is problematic that the pressure is weak and unusable for purging the insulators of the electrostatic precipitator 20a or backwashing the filters 62 of the bag filter 20b; and if the pressure (total pressure) of carbon dioxide is over 1.0 MPa, it is problematic that the pressure exceeds the pressure limit of the electrostatic precipitator 20a or the bag filter 20b and exerts an adverse effect. When the pressure (total pressure) of the carbon dioxide gas is in the range of 0.5 MPa to 0.8 MPa, the carbon dioxide gas may most preferably be used for purging the insulators of the electrostatic precipitator 20a or backwashing the filters 62 of the bag filter 20b.

In the embodiment, when a carbon dioxide gas branched from the recirculating gas recirculating through the recirculation-side feed line 51 is introduced to at least one of the through-holes 49 of the combustion furnace 11 such as a soot blower and the air intake portions 50 of equipments such as the forced draft fan 7, the induced draft fan 21 and the primary air fan 27, the air ingress from the outside to the inside into the equipments of the boiler facility may be constrained to prevent the reduction of carbon dioxide concentration in the recirculating exhaust gas. Since the carbon dioxide gas has a carbon dioxide concentration in the gas substantially equal to that of the recirculating carbon dioxide gas and a pressure (total pressure) in the range of 1 kPa to 30 kPa, preferably in the range of 3 kPa to 10 kPa due to the forced draft fan 7, etc., the lowering of the carbon dioxide concentration in the recirculating exhaust gas may be appropriately prevented. If the carbon dioxide concentration is below the concentration in the recirculating carbon dioxide gas, it is problematic that the carbon dioxide concentration in the recirculating carbon dioxide gas is lowered and adversely affects the steady operation; if the pressure (total pressure) of carbon dioxide is below 1 kPa, it is problematic that the carbon dioxide gas is unable to seal the through-hole 49 of the combustion furnace 11 and the equipment air ingress portion 50 due to low pressure; and if the pressure (total pressure) of carbon dioxide is over 30 kPa, it is problematic that a cost considerably increases because another compressor is necessary for the recirculation line 15, etc. When the pressure (total pressure) of the carbon dioxide gas is in the range of 3 kPa to 10 kPa, the lowering of the carbon dioxide concentration in the recirculating exhaust gas may be appropriately prevented. Since the recirculation-side feed line 51 is used for sealing the equipments rather than purging the carbon dioxide gas, the recirculation-side feed line 51 is well applicable to low pressures in the range of 1 kPa to 30 kPa.

In the embodiment, before the steady operation of the boiler facility, the air 4 is introduced through the first air introduction line 37 to purge the flame detector 10; the air 4 is introduced through the second air introduction line 43 to purge the electrostatic precipitator 20a; the air 4 is introduced through the second air introduction line 43 to backwash the bag filter 20b; and, after the steady operation of the boiler facility where the carbon dioxide gas recirculates, the switches 36, 39, 42 and 45 switching the air introduction lines 37 and 43 and the feed lines 33, 40 and 46 to introduce the carbon dioxide gas through the first feed line 33 to purge the flame detector 10 or to introduce the carbon dioxide gas through the second or third feed line 40 or 46 to purge the electrostatic precipitator 20a and to introduce the carbon dioxide gas through the second or third feed line 40 or 46 to backwash the bag filter 20b. As a result, the flame detector 10 and the electrostatic precipitator 20a may be continuously purged before the steady operation of the boiler facility until after the steady operation. In the bag filter 20b, the filters 62 may be continuously backwashed before the steady operation of the boiler facility until after the steady operation.

It is to be understood that a method and facility for feeding carbon dioxide to an oxyfuel combustion boiler according to the invention are not limited to the above embodiment and that various changes and modifications may be made without departing from the scope of the invention. For example, a manual operation may be employed instead of the controller.

The invention claimed is:

1. A method for feeding carbon dioxide to an oxyfuel combustion boiler wherein air is separated by an air separation unit into oxygen and the other nitrogen-rich gas; the oxygen obtained by the air separation unit and fuel are burned by a burner of a combustion furnace; at least dust removal is conducted for resultant exhaust gas from the combustion furnace; and then, a portion of the exhaust gas is recirculated as a recirculating gas to said combustion furnace and a remaining non-recirculating exhaust gas is discharged, wherein a carbon dioxide gas is taken out from the remaining non-recirculating exhaust gas and is introduced into an equipment of an oxyfuel combustion boiler facility for purging.

2. A method for feeding carbon dioxide to an oxyfuel combustion boiler as claimed in claim 1, wherein a portion of said recirculating recirculation gas is branched as a carbon dioxide gas and is introduced into the equipment of the oxyfuel combustion boiler facility for sealing.

3. A method for feeding carbon dioxide to an oxyfuel combustion boiler as claimed in claim 1, wherein said remaining non-recirculating exhaust gas is separated by cooling into a highly-purified carbon dioxide gas not containing impurities and a carbon dioxide gas containing impurities, said highly-purified carbon dioxide gas not containing impurities being used for purging a flame detector of the combustion furnace, said carbon dioxide gas containing impurities being used for purging an insulator of an electrostatic precipitator or backwashing a filter of a bag filter.

4. A method for feeding carbon dioxide to an oxyfuel combustion boiler as claimed in claim 2, wherein said carbon dioxide gas branched from the recirculating recirculation gas is introduced to at least one of a through-hole of the combustion furnace and an equipment air ingress portion.

5. A facility for feeding carbon dioxide to an oxyfuel combustion boiler having a mill for feeding fuel, an air separation unit for separating air into oxygen and a nitrogen-rich gas, an air intake line for feeding air, a combustion furnace into which fuel from said mill and the oxygen or air from said air separation unit or from said air intake line is introduced through an introduction line to perform combustion with a burner, an exhaust gas line for leading an exhaust gas from the combustion furnace to outside of the combustion furnace, a precipitator for treating the exhaust gas included in said exhaust gas line and a recirculation line for recirculation of a portion of the exhaust gas at least dust-removed by said precipitator to said burner, said facility comprising an exhaust gas capture line for taking out a carbon dioxide gas from a remaining non-recirculating exhaust gas and carbon dioxide gas feed lines for introducing said carbon dioxide gas to an equipment of the oxyfuel combustion boiler facility.

6. A facility for feeding carbon dioxide to an oxyfuel combustion boiler as claimed in claim 5, which comprises a recirculation-side carbon dioxide gas feed line for branching a portion of the recirculating recirculation gas as a carbon dioxide gas to introduce said carbon dioxide gas to the equipment of the oxyfuel combustion boiler facility.

7. A facility for feeding carbon dioxide to an oxyfuel combustion boiler, as claimed in claim 5, wherein the exhaust gas capture line includes coolers for separating the remaining non-recirculating exhaust gas into a highly-purified carbon dioxide gas not containing impurities and a carbon dioxide gas containing impurities, said carbon dioxide gas feed lines including a line for use of said highly-purified carbon dioxide gas not containing impurities to purge a flame detector of the combustion furnace and a line for use of said carbon dioxide gas containing impurities to purge an insulator of an electrostatic precipitator or to backwash a filter of a bag filter.

8. A facility for feeding carbon dioxide to an oxyfuel combustion boiler as claimed in claim 6, wherein said recirculation-side carbon dioxide gas feed lines includes a line for introducing the carbon dioxide gas branched from said recirculating recirculation gas to at least one of a through-hole of the combustion furnace and an equipment air ingress portion.

9. A facility for feeding carbon dioxide to an oxyfuel combustion boiler as claimed in claim 5, wherein said precipitator is an electrostatic precipitator.

\* \* \* \* \*